US010071487B2

(12) United States Patent
Rus et al.

(10) Patent No.: US 10,071,487 B2
(45) Date of Patent: Sep. 11, 2018

(54) SYSTEMS AND METHODS FOR COMPILING ROBOTIC ASSEMBLIES

(71) Applicant: Massachusetts Institute of Technology, Cambridge, MA (US)

(72) Inventors: Daniela L. Rus, Weston, MA (US); Joseph J. DelPreto, Croton-on-Hudson, NY (US); Ankur M. Mehta, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 617 days.

(21) Appl. No.: 14/705,493

(22) Filed: May 6, 2015

(65) Prior Publication Data
US 2016/0016321 A1    Jan. 21, 2016

Related U.S. Application Data

(60) Provisional application No. 61/989,310, filed on May 6, 2014.

(51) Int. Cl.
*G06G 7/48* (2006.01)
*B25J 19/00* (2006.01)
*B25J 13/00* (2006.01)

(52) U.S. Cl.
CPC .............. *B25J 19/007* (2013.01); *B25J 13/00* (2013.01); *Y10S 901/50* (2013.01)

(58) Field of Classification Search
CPC ....................................................... B25J 19/007

USPC ............................................................. 703/6
See application file for complete search history.

(56) References Cited

U.S. PATENT DOCUMENTS

| 2005/0036783 A1 | 2/2005 | Morita et al. |
| 2005/0146551 A1 | 7/2005 | Yamazaki et al. |
| 2009/0043543 A1 | 2/2009 | Durney et al. |
| 2010/0002402 A1 | 1/2010 | Rogers et al. |
| 2011/0287228 A1 | 11/2011 | Durney et al. |
| 2013/0269336 A1 | 10/2013 | O'Connell et al. |

FOREIGN PATENT DOCUMENTS

| EP | 1 176 548 A2 | 1/2002 |
| WO | WO 2004/028937 A2 | 4/2004 |
| WO | WO 2012/024696 A2 | 2/2012 |
| WO | QO 2012/109559 A1 | 8/2012 |

OTHER PUBLICATIONS

An, Rus (inventor): Programming and Controlling Self-Folding Robots; 2012 IEEE International Conference on Robotics and Automation; RiverCentre, Saint Paul, Minnesota, USA; May 14-18, 2012.*

(Continued)

*Primary Examiner* — Hugh Jones
(74) *Attorney, Agent, or Firm* — Daly Crowley Mofford & Durkee LLP (57) ABSTRACT

Systems and methods to systematize the development of machines using inexpensive, fast, and convenient fabrication processes are disclosed. In an embodiment, a robot compiler generates a fabrication system, including mechanical, electrical, and software assemblies, that can be used for assembling a robot according to a user design.

24 Claims, 10 Drawing Sheets

(56) References Cited

OTHER PUBLICATIONS

Response filed on Dec. 24, 2016 to Non-Final Office Action dated Sep. 24, 2015; for U.S. Appl. No. 13/723,364; 12 pages.
Final Office Action dated May 4, 2016; for U.S. Appl. No. 13/723,364; 16 pages.
Non-Final Office Action dated Aug. 12, 2016; for U.S. Appl. No. 13/723,364, 13 pages.
Response filed on Sep. 26, 2016 to Non-Final Office Action dated Aug. 12, 2016; for U.S. Appl. No. 13/723,364; 11 pages.
Final Office Action dated Jan. 6, 2017; for U.S. Appl. No. 13/723,364; 10 pages.
Response to Office Action dated Jan. 6, 2017 corresponding to U.S Appl. No. 13/723,364; Response filed Jan. 20, 2017; 11 Pages.
Notice of Allowance dated Mar. 27, 2017 for U.S. Appl. No. 13/723,364; 11 Pages.
Non-Final Office Action dated Sep. 24, 2015; for U.S. Appl. No. 13/723,364; 15 pages.
Hawkes et al.; "Programmable Matter by Folding;" Proceedings of the National Academy of Sciences, vol. 107, No. 28; Jul. 13, 2010; www.pnas.org/cgi/doi/10.1073/pnas.0914069107; pp. 12441-12445.
Onal et al.; "Towards Printable Robotics: Origami-Inspired Planar Fabrication of Three-Dimensional Mechanisms;" 2011 IEEE International Conference on Robotics and Automation (ICRA); May 9-13, 2011; pp. 2-7.
Paik et al.; "Stretchable Circuits and Sensors for Robotic Origami;" 2011 IEEE/RJS International Conference on Intelligent Robots and Systems; Sep. 25-30, 2011; pp. 414-420.
PCT Search Report and Written Opinion of the ISA dated Feb. 4, 2014; for PCT Pat. App. No. PCT/US2013/059110; 9 pages.
PCT International Preliminary Report on Patentability and Written Opinion of the ISA dated Mar. 26, 2015; for PCT Pat. App. No. PCT/US2013/059110; 9 pages.
Amendment filed on Jun. 23, 2016 to the Final Office Action dated May 4, 2016; for U.S. Appl. No. 13/723,364; 13 pages.
Advisory Action dated Jun. 29, 2016; for U.S. Appl. No. 13/723,364; 3 pages.
Request for Continued Examination filed on Jul. 8, 2016; for U.S. Appl. No. 13/723,364; 3 pages.

\* cited by examiner

SYSTEMS AND METHODS FOR COMPILING ROBOTIC ASSEMBLIES

RELATED APPLICATIONS

This application claims priority to and benefit of U.S. Provisional Application No. 61/989,310 (filed May 6, 2014), which is incorporated here by reference.

FEDERALLY SPONSORED RESEARCH

This invention was made with Government support under Grant No. CCF-1138967 awarded by the National Science Foundation. The government has certain rights in the invention.

BACKGROUND

The creation of new machines requires significant development time, financial resources, and technical expertise. While a wealth of tools exist for many robot development steps, there is not a single end-to-end process which begins with a novice user specifying a desired task and resulting in a fully functional robot able to perform that task.

An alternative to traditional machine design and fabrication may be referred to as "printable" and/or "foldable" machines. Such designs may utilize tools which are readily available, inexpensive to operate, and require minimal technical knowledge by a user.

As an illustrative example of the concepts, systems, circuits, devices and techniques sought to be protected herein, assume a home owner needs a machine to explore areas of his basement in order to detect carbon monoxide and radon. The machine may be required to traverse a cluttered environment, carry a sensor, and report back to the user. Using traditional design and fabrication techniques to create such a machine may be time consuming and inconvenient for the user. However, if the user uses a foldable machine described below, the user may feed specifications to a foldable machine compiler, which chooses notional designs from a pre-populated library or database, refines geometries based upon the task to be performed, and produces detailed design and program files. The machine may then be fabricated from the design and program files, and the user may collect the machine and place it into operation.

In another example, a custom gripper may be desired for an electronics assembly line. The gripper could, for example, be utilized by a pick and place machine. The assembly line manager can specify traits of the part such as the mass and approximate geometry. These specifications may be provided to the foldable machine compiler and fabrication process to produce a custom gripper to meet the task needs.

BRIEF DESCRIPTION OF THE DRAWINGS

Like numbers in the drawings denote like elements. Connectors within circuit or block diagrams may represent single wires, buses, or other types of connections between blocks. A single connector line should not be construed to limit the type of connection to a single wire.

The figures, including the flowcharts and block diagrams, are provided for exemplary purposes and are not intended to limit the scope of this disclosure. Although the figures depict diagrams and flowcharts with particular numbers of blocks connected in particular arrangements or sequences, these are examples only. Other arrangements and sequences are within the scope of this disclosure.

DETAILED DESCRIPTION

In an embodiment, to create a foldable machine, a user may provide specifications to a foldable machine compilation system, which may choose appropriate designs for completion of the specified task from a pre-populated library or database, refine geometries based upon the task to be performed, and produce detailed design and program files. The detailed design and program files may include electronics designs, software for operating and/or controlling the robot, and/or mechanical designs and instructions, The designs may include a cutting pattern for cutting a template out of a sheet of substrate material, a circuit pattern for creating and populating a circuit on the template, and/or a folding pattern that can be applied to the template in order to form the template into the final machine.

Laser cutters, lamination, and PCB-like component assembly followed by a final assembly that folds the substrate into its final form may be utilized. This so-called printable approach may allow for rapid development of low-cost machines using a general process that links specifications to prototypes, without requiring in-depth technical knowledge from the end user. The manufacturing process may include at least some or all of the following: (1) modeling of the machine; (2) parameter instantiation according to user specifications, i.e. modification of the model in order to tailor the machine to a particular task; (3) printed body fabrication; (4) printed electronics on the 2D body; (5) population of electronic components on the body; and (6) assembly of the 3D machine using folding. The resulting machines may be relatively light-weight (e.g. about 3 g in some instances) and may function as autonomous, programmable machines or robots. In an embodiment, a foldable machine may be fabricated in less than one day, less than 8 hours, less than four hours, less than two hours, less than one hour, or in any appropriate amount of time.

In an embodiment, the foldable machine compiler may generate a fabrication system for assembling the functioning robot. The fabrication system can include one or more of a mechanical design component, an electrical design component, and a software design component.

Compilation System

Figure 1:
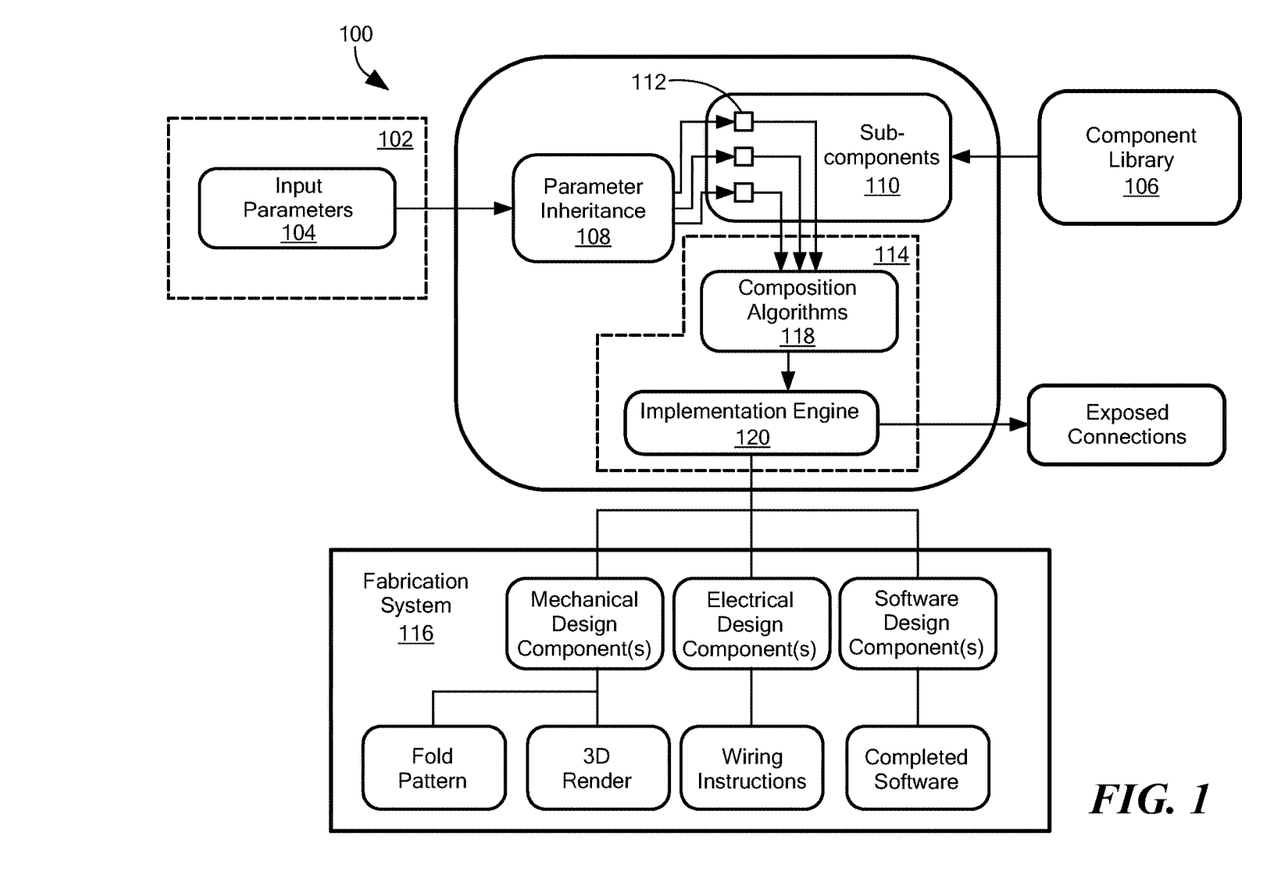
FIG. 1 is a block diagram of a system for compiling robot designs.

Referring to FIG. 1, a system 100 for generating applications for controlling a robot comprises an interface 102 to receive design specifications which may include input parameters 104 for a robot. The design specifications may refer to or may include the subcomponents 110, which will be described below in greater detail. In embodiments, interface 102 is a user interface that allows a user to specify a robot design, including input parameters 104 for customizing or defining the robot. The interface 102 may be a graphical user interface, a textual user interface, or any type of user interface that allows a user to enter specifications for the robot design.

The input parameters 104 are data elements generated as a result of the user's input to interface 102. A user may, for example, use the interface 102 to choose modular components that will become part of the final robot. The user may then customize or supply parameters of the modular components. Data identifying and customizing the chosen modular components is then provided by interface 102 as input parameters 104. These input parameters may define the user's input into the robot design. For example, if the user is designing a robotic arm, the user can use interface 102 to choose an arm portion, a finger portion, and a mount portion for mounting the arm to a fixed object, as well as other modular components of the robotic arm.

Depending on the modular component, interface 102 allows the user to specify parameters that customize the modular component for the specific robot being designed. For example, in the case of the arm portion, the user may specify the number of segments and elbows in the arm, and the size and length of each segment. In the case of the finger portion, the user may specify the number of segments and knuckles in the finger. In the case of the mount portion, the user may specify the type and size of the mount. As another example, if the robot design contains a wheel, the user may specify the size of the wheel and the number of wheels included in the robot. The type of modular component, the number of each modular component, and parameters that customize the components may be included as input parameters 104. Optionally, the user may also specify software components that can be used to control the robot.

User interface 102 also allows the user to arrange and connect the modular components as desired to form a robot design.

System 100 also includes a component library 106. Library 106 is a library or database of predefined modular components each describing a modular element of the robot. Continuing the example above, library 106 may contain predefined modular components that define the arm, fingers, and mount of the robotic arm. Library 106 also contains other types of modular elements including, but not limited to arms, hinges, beams, motors, fingers, mounts, tendons, electrical- or software-based controllers, sensors, wheels, robot bodies, or any other type of element to be included in a robot. Library 106 may also include software elements for controlling the robot. These software elements may include drivers and other software modules for interfacing with the robot's hardware, and may also include graphical user interface (GUI) elements that can be compiled into an application for controlling the robot. For example, Library 106 may include code, libraries, and/or compiled software modules for GUI elements such as buttons, sliders, toggle switches, levers, wheels, etc. These GUI elements can be compiled into an app that may be executed by a user on a PC, mobile device, or other computing device for controlling the robot's actions.

At least some of the modular elements may be composite elements that include or call-out other modular elements from library 106. For example, library 106 may include a robotic hand element, which in turn includes two or more finger elements and a base element to which the fingers attach. As another example, a wheeled platform element in library 106 may include a base element and at least two wheel elements, each of which may also be a component element in library 106. The composite elements may also include GUI elements for controlling the composite element and/or for controlling individual elements that comprise the composite element.

In embodiments, each modular element in the library includes the predefined components including electrical, mechanical, software, and composite elements. The electrical components include lists of electrical or electromechanical components required by the electrical component, as well as definitions of electrical connections for connecting the electrical components to other elements of the robot. For example, a robotic arm may include electrical components such as servo-motors, LEDs, sensors, or other electrical components that may be included in a final assembly of the arm. The robotic arm, as defined in database 106, may also include definitions of how the electrical components should be connected. The robotic arm may also include a modular controller as part of the electrical elements. The modular controller is an electrical element that includes a processor, that couples to and controls other electrical elements, and that facilitates communication between other modular controllers and a central controller. The modular controller will be described in greater detail below.

System 100 also includes a parameter inheritance module 108 coupled to receive the input parameters 104 from interface 102. Parameter inheritance module 108 modifies the input parameters 104 and applies them to the modular components chosen by the user and received from library 106. The modular components may also include fixed and/or predefined parameters such as a required voltage, a data type of a UI element, an angle of a fold, a non-adjustable width, etc. In embodiments, the modular components can also include parameters that may be calculated using functions that take other parameters (user modified parameters, fixed parameters, etc.), or other data, as inputs. The parameter inheritance module 108 may handle any of these types of parameters for producing a robot design.

The modular components may be modified or customized by the input parameters received from the user form sub-components 110 of the robot. As depicted in FIG. 1, the sub-components 110 contain parameters 112, which provide customization of the modular components for the specific robot being designed. As discussed above, parameters 112 may include data to specify size, number of elements, connection details, etc. In the case of the robotic arm, parameters 112 may specify the number of segments and elbows of the arm, the size of the segments, information about how the elements of the arm are to be connected, etc.

System 100 also includes a compiler 114 that receives sub-components 110 and generates a robot design, as defined by a fabrication system 116. Compiler 114 includes a composition algorithms module 118 and an implementation engine 120.

Composition algorithms module 118 contains algorithms and processes that receive the sub-components 110 and produce a fabrication file. As noted above, the sub-components are modular components from library 106 that have been modified by applying user parameters 112 to the components. The composition algorithms module 118 may compile each of these sub-components 110 to enable them to be connected to and operable with the final robot design. For example, assume that a particular sub-component is a robotic arm having two segments and an elbow controlled by a servo-motor. The sub-component may be defined by the mechanical structure or assembly of the arm, the electrical components and connections that operate the arm, and software that can be used to control the arm. The composition algorithm module may compile each of these, within the context of parameters 112, to generate a fabrication file that defines these elements for the specific robot.

To generate the electrical components, the composition algorithm module 118 may identify electrical connections to be made between the sub-components in order to effectuate the final robot design. To do so, the composition algorithm module 118 may form or define specific electrical connections that will allow the robot to operate. For example, in a robotic arm, the composition algorithm module 118 may specify that a servo-motor in the arm should be connected to, say, a power pin, a ground pin, and a pulse-width modulated output pin of a modular controller in the arm.

The composition algorithm module 118 may also generate electrical components and/or electrical connections based on the parameters 112, which may include parameters set by the user, fixed parameters, parameters calculated by a function, etc. In embodiments, the composition algorithm module 118 can also choose/insert the controller modules into a robot design. For example, if the user specifies that a robotic arm has three segments and two joints, the composition algorithm module 118 may specify the number of electrical components needed and the type of components (e.g. two servo-motors in this example), and connections for two servo-motors, one at each joint.

The composition algorithm module 118 may also define inter-module connections. For example, the composition algorithm module 118 may specify that the modular controller in the arm will be connected to, say, communication pins 1 and 2 of a central controller of the robot, which may be a separate sub-component of the robot. The electrical interconnections can be subsequently used by the implementation engine 20 to create wiring diagrams, wiring instructions, etc.

To generate the mechanical components, the composition algorithm module 118 may identify mechanical interconnections and couplings between the sub-components. For example, if the user specifies that the robotic arm has two segments, the composition algorithm module 118 will define a joint between the two segments. If the user specifies that the robotic arm has three segments, the composition algorithm 118 will define two joints.

To generate the software components, the composition algorithm module 118 may identify software components associated with the sub-components 110. The software components may comprise control elements, such as graphical user interface elements, that can be incorporated into a software application for controlling the robot. The software application may be executed by a personal computer, mobile phone, tablet computing device, etc. The software components may also include software that is programmed into the robot controller to operate the robot and its parts.

The robotic arm may include sliders, knobs, or other graphical software elements that can move individual segments of the arm. In another embodiment, the software is an API and/or software library for controlling the sub-component that can be accessed by other software applications.

The composition algorithm 118 may tailor the software elements in accordance with the parameters 112. For example, if the robotic arm contains two servo motors, composition algorithm 118 may produce software with graphical control elements or API functions for controlling the two servo motors.

Composition algorithm 118 collects the electrical, mechanical, and software elements of the robot design as a so-called fabrication file, which is sent to implementation engine 120.

In an embodiment, the composition algorithm module 118 takes, as an input, the individual design elements from each sub-component and compiles them into a single set of design elements. The single set of design elements is then sent to the implementation engine 120. Mechanical design elements can be virtually arranged and connected according to the specified connections and combined into a mechanical design that incorporates the individual sub-components by unifying shared geometries and adding support material as necessary. The electrical elements are combined by combining all of the device requirements for assignment into available processor ports. For example, a component controller may be assigned to ports (or e.g. pins) 5 and 6, for example, of the central controller. These assigned ports are then codified into a software library and mapped to the software elements associated with each sub-component (e.g. software elements associated with the components in library 106) to form a single software project that can be compiled into an application for controlling the robot by sending signals to the appropriate ports. The software project may include software that can run on the processor(s) of the robot, an application that can run on a computer or mobile device, or a combination thereof.

Implementation engine 120 receives the fabrication file and produces a fabrication system 116 that can be used to assemble the final robot. Implementation engine 120 comprises software drivers or algorithms that translate the fabrication file into output types that can be used by specific fabrication tools.

In one example, the mechanical elements of the robot are implemented as a foldable or printable robot that can be printed as a two-dimensional cutout and subsequently folded to form a three-dimensional structure. Such robots are described in U.S. patent application Ser. No. 13/723,364, which is incorporated here by reference in its entirety. In this example, implementation engine 120 may generate files that a printer, such as a vinyl or plastic sheet printer, can use to print the robotic structure. Compilation engine may also create a fold pattern or other printable file containing instructions for how to fold or assemble the mechanical elements of the robot. In another example, implementation engine 120 creates a 3D print file that can be sent to a 3D printer to print or grow the part.

The implementation engine 120 also generates electronic design components such as wiring diagrams and wiring instructions as part of fabrication system 116. The wiring diagrams and instructions correspond to the electrical connections generated by the implementation engine. The wiring diagrams and instructions can be used by an assembler to connect the electrical components of the robot.

The implementation engine 116 also generates software design components. The software design components may be software code, a library, an API, and/or other software elements that can be used to control the robot such as GUI elements that can be incorporated into a software application to control the robot, a fully or partially compiled computer or mobile application for controlling the robot, or a combination thereof. The software components generated by the implementation engine 116 can also include software documentation for connecting to the API or for using the GUI elements or application.

Figure 2A:
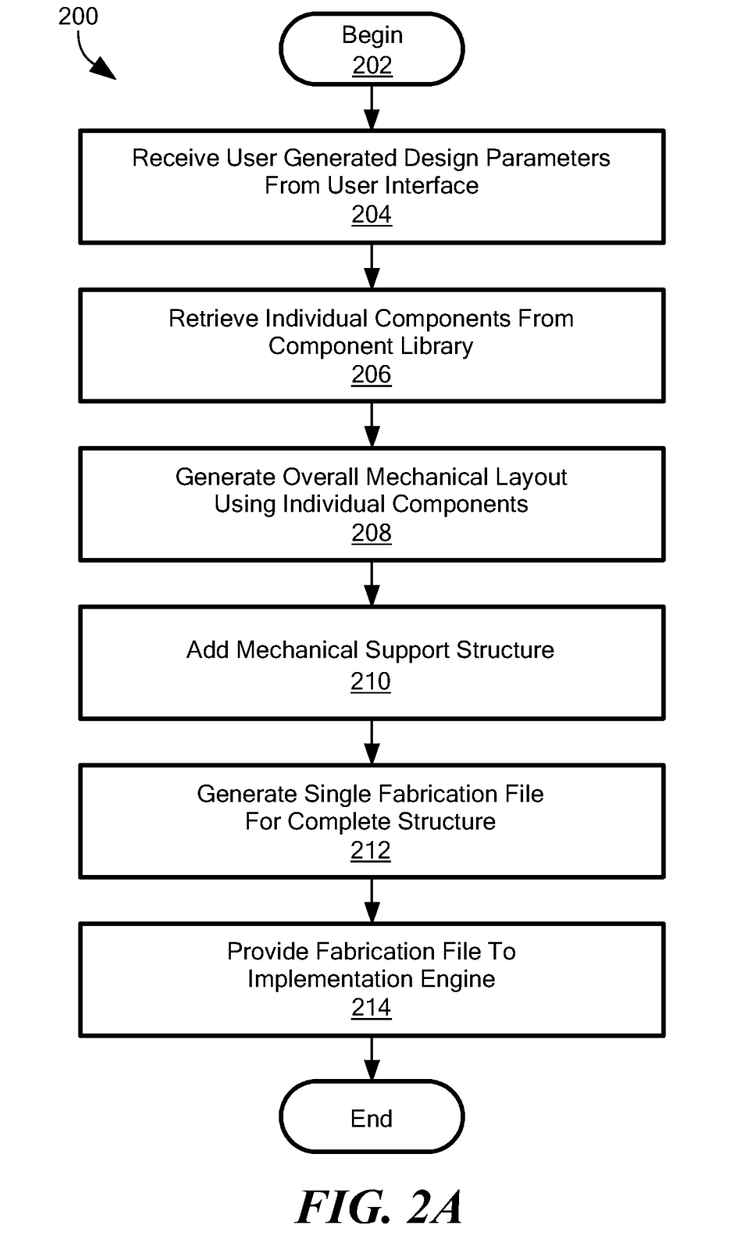
FIG. 2A is a flow-chart of a method for compiling a mechanical portion of a robot design.

Referring to FIG. 2A, a method 200 for generating the mechanical design for a robot begins in block 202. In block 204 the system 100 receives user generated design parameters such as input parameters 104 from interface 102. In block 206, the system 100 receives modular components to be included in the robot design from library 106.

In block 208, compiler 114 generates an overall mechanical layout of the robot including mechanical portions of the components from library 106, parameters 104 received from interface 102.

In block 210, the composition algorithm module 118 adds mechanical support structures. For example, if two components are to be mechanically coupled, then mounts, joints, fasteners, flanges, or other mechanical support structures are added to the robot design. Additionally or alternatively, composition algorithm module 118 adds mechanical support structures by, for example, adding mechanical supports such as straps or additional beams to strengthen the mechanical structure of the robot if needed.

In block 212, composition algorithms module creates a fabrication file that defines the complete structure of the robot. In block 214, implementation engine 120 translates the fabrication file into fabrication system 116 which can be used to print, build, and/or assemble the robot.

Figure 2B:
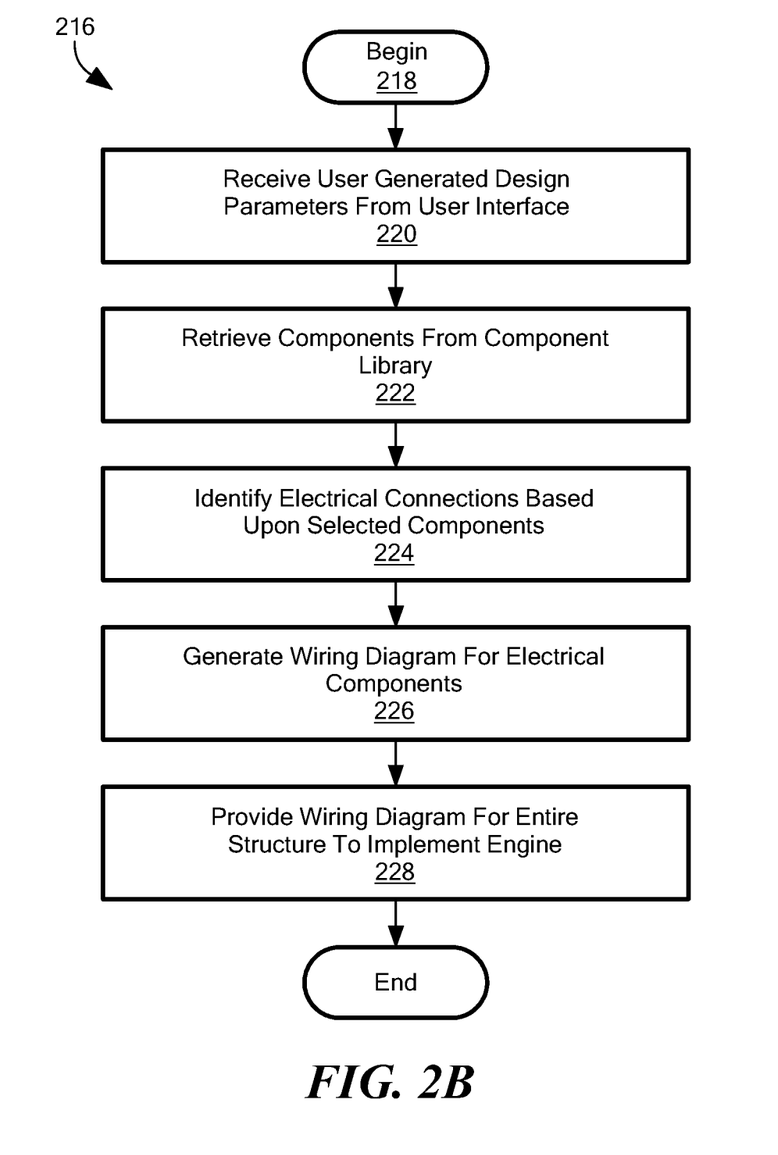
FIG. 2B is a flow-chart of a method for compiling an electrical portion of a robot design.

Referring to FIG. 2B, a method 216 for generating the electrical design for a robot begins in block 218. In block 220 the system 100 receives user generated design parameters such as input parameters 104 from interface 102. In block 222, the system 100 receives modular components to be included in the robot design from library 106.

In block 224, compiler 114 generates and defines electrical connections based upon electrical portions of the selected components from library 106 and the parameters 104 received from interface 102.

In block 226, the composition algorithm module 118 generates wiring diagrams for some or all of the selected modular components. In block 228 a wiring diagram for the entire structure and/or for a portion of the structure is provided to the implementation engine 120, which generates the electrical wiring diagram and instructions as part of fabrication system 116.

Figure 2C:
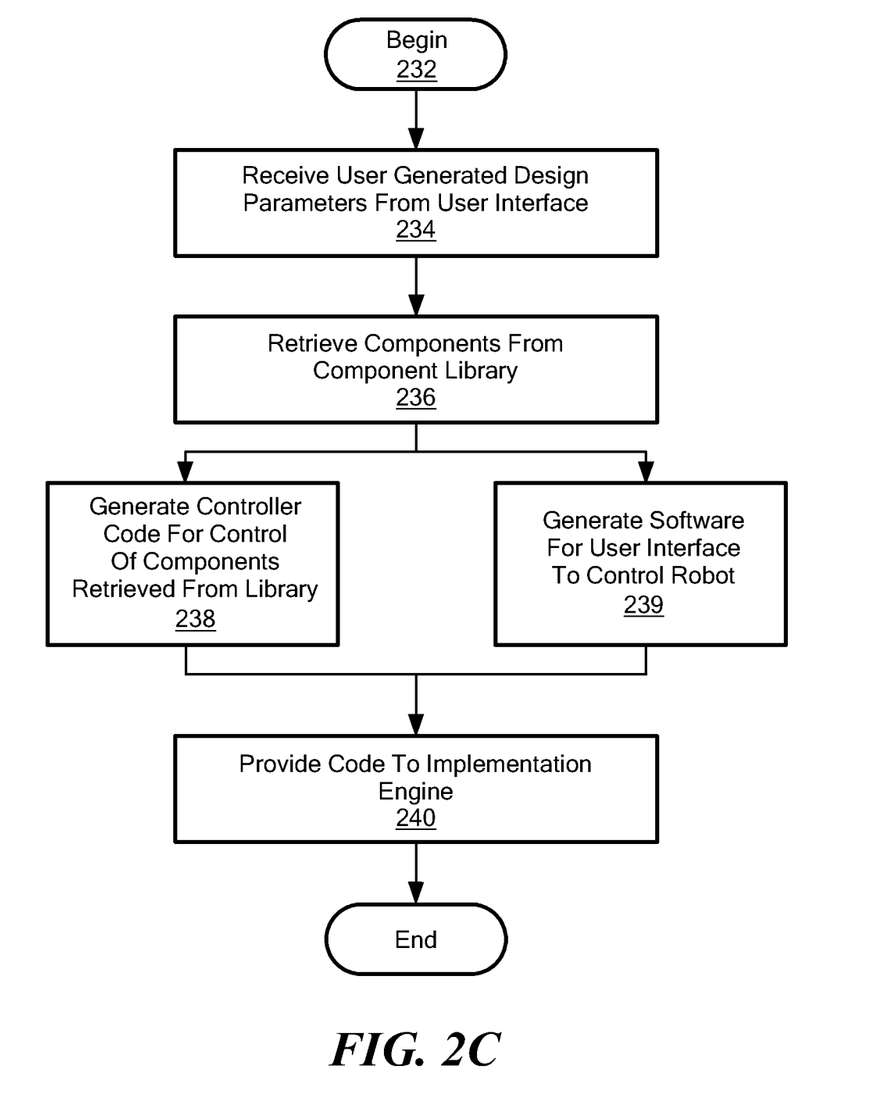
FIG. 2C is a flow-chart of a method for compiling a software portion of a robot design.

Referring to FIG. 2C, a method 230 for generating software applications and/or software components for a robot begins in block 232. In block 234 the system 100 receives user generated design parameters such as input parameters 104 from interface 102. In block 236, the system 100 receives modular components to be included in the robot design from library 106.

In block 238, compiler 114 generates software libraries, GUI elements, or other software elements for controlling the robot and/or the components of the robot as retrieved from library 106. In block 240, the software code is provided to implementation engine 240.

Figure 3:
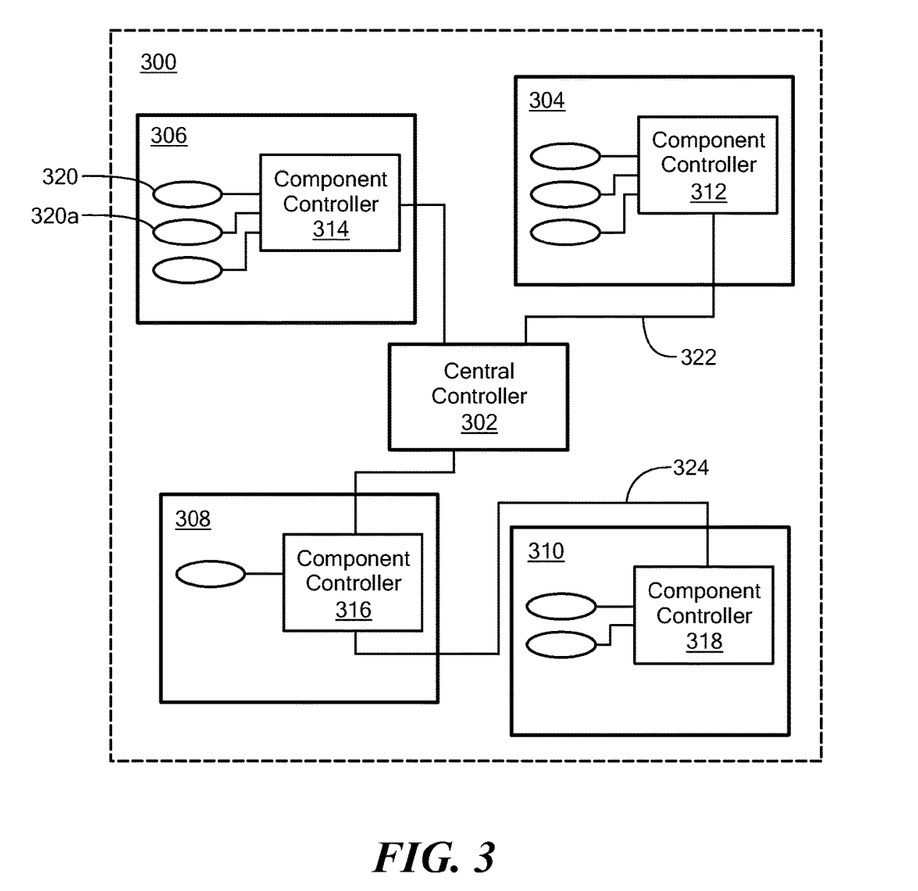
FIG. 3 is a block diagram of an electrical controller layout of a modular robot.

Referring now to FIG. 3 a robot 300 includes a central controller 302 and multiple component modules 304, 306, 308, and 310. The central controller may include a processor and hardware storage, such as a memory for example. The memory may contain software which, when executed by the processor, can directly control the robot, can provide an interface for external software to control the robot, or both. In an embodiment, the central controller may include a processor, microprocessor, custom processor or any type of processor that can be used to control the robot. In one embodiment, the central processor may be implemented by an Arduino™ system, a Raspberry Pi™ system, a custom microprocessor-based system, or the like.

The component modules can be modular elements added to the robot by the user and/or components automatically added to the robot by the composition module. For example, if the robot is a robotic arm, component modules 304-310 may be individual arms, fingers, displays, or other elements added to the robot by the user.

The component modules contain a component controller 312 for controlling the component modules. Coupled to the component controllers are one or more controllable elements 320. The controllable elements are electrical or electromechanical elements that can be controlled and operated by the component controller. Controllable elements 320 may include, but are not limited to, motors, LEDs, displays, power supplies, digital or analog input or output ports, serial or parallel communication ports, sensors, speakers, microphones, and the like. Controllable elements 320 may be any type of electrical or electromechanical device that can be included in a robot. Each component controller 314-318 can be coupled to and control one or more controllable elements 320. In other embodiments, the central controller 302 may directly control controllable elements 320 without the need for computer controllers 314-318. In this case, the controllable elements 320 may be coupled directly to the central controller 302. In other embodiments, the central controller 302 may optionally be omitted from robot 300. In this case, one or more component controllers 314-318 (individually or in concert with each other) may act to control the robot functionality.

The component controllers can be in direct communication with central controller 302, as shown by communication line 322 between central controller 302 and component controller 304. Additionally or alternatively, component controllers can be in indirect communication with central controller 302. For example, component controller 318 is coupled directly to component controller 316 via communication line 324 and communicates with central controller 302 indirectly by sending and receiving communication through component controller 316.

In an embodiment, the communication lines such as 322 and 324 are serial communication lines, parallel communication lines, wireless communication lines, or any type of communication media between component controllers and/or central controller 302.

As an example, if component module 306 is an articulable finger of a robotic arm, component controller 314 may communicate with central controller 302, which may instruct component controller 314 as to how and when to articulate the finger. Controllable element 320 may be a servo-motor to move the finger and controllable element 320a may be an LED, for example. Communications from the central controller instruct component controller 314 as to how and when to activate the servo-motor 320 to move the finger, and how and when to light the LED 320a.

Figure 4:
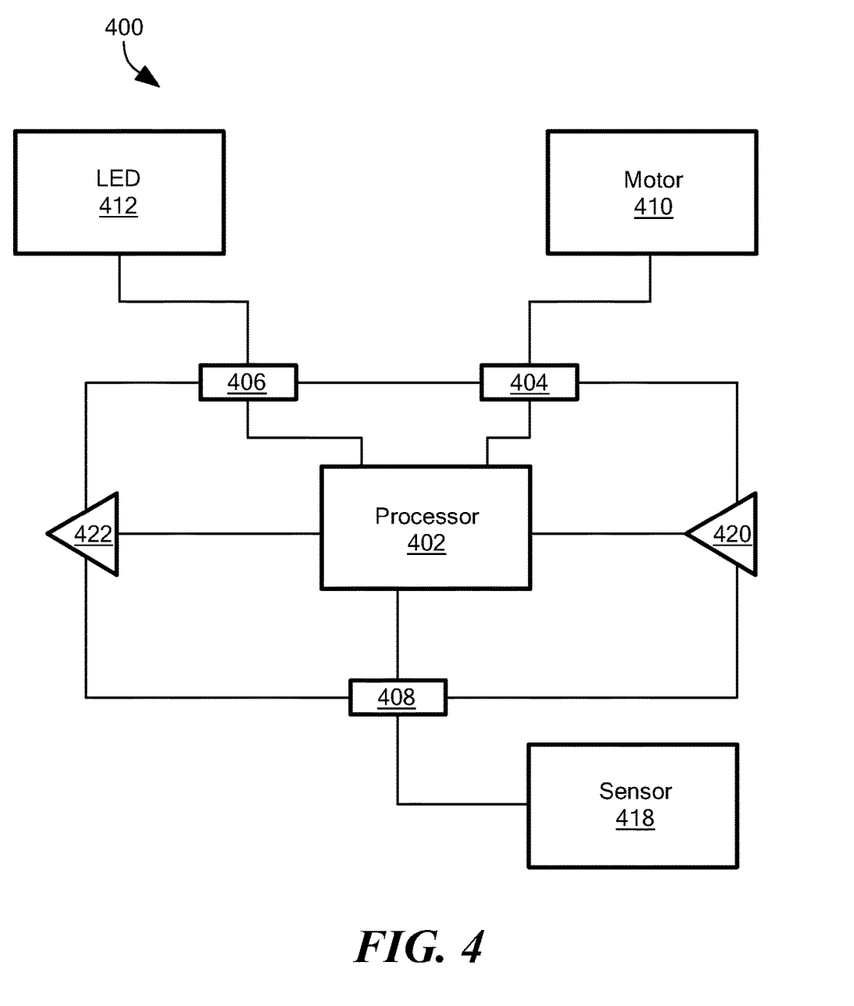
FIG. 4 is a block diagram of a controller module and components.

Referring now to FIG. 4, a component controller 400 may be the same as or similar to one or more of component controllers 312-318. Component controller 402 includes a processor 402 and memory such as a ROM or Flash (not shown). Software, e.g. firmware, instructions may be stored on the memory and executed by the processor to effectuate functionality of the component controller 400. In an embodiment, each component controller has the same software or firmware running on its processor.

The processor 402 may have one or more input and/or output ("I/O") ports 404, 406, and 408 that can be coupled to controllable elements such as motor 410, LED 412, and sensor 414. In an embodiment, ports 404, 406, and 408 can be programmed to be input ports, output ports, digital ports, analog ports, etc. in response to configuration commands received from central controller 302. The compiler 114 may determine, during compilation of the robot design, how the ports 404-408 will be configured based on what type of controllable element is coupled to the port.

Component controller 400 also includes one or more communication ports such as communication ports 420 and 422. Communication ports 420 and 422 may be configurable as so-called upstream ports for communicating with an upstream component controller (e.g. component controller 316) or for communicating with central controller 302. Communication ports 420 and 422 may also be configurable as so-called downstream ports for communicating with a downstream component controller (e.g. component controller 318). Communication ports may be serial ports, parallel communication ports, wireless ports, networking or LAN ports, or any other type of communication port.

The software or firmware executed by processor 402 may provide an interface to initialize the IO ports 404-408. For example, the software compiled by compiler 114 and executed by central controller 302 may initialize the IO ports 404-408 by sending initialization command to the component controller 314 based on the type of controllable element connected to the IO port. In this example, central controller 302 may send command to initialize port 404 as an analog output port to control motor 410, to initialize port 406 as an analog output port to control LED 412, and initialize port 408 as a digital input port to receive digital data from sensor 418. Of course, if sensor 418 provides analog data, port 408 can be configured as an analog input port.

Once the ports are initialized, central controller 302 can send commands to processor 402 to control the elements attached to the ports. For example, central controller 302 may issue a command that instructs processor 402 to provide, say, a 2.5 V or other output voltage on port 406 to illuminate LED 412.

Figure 5:
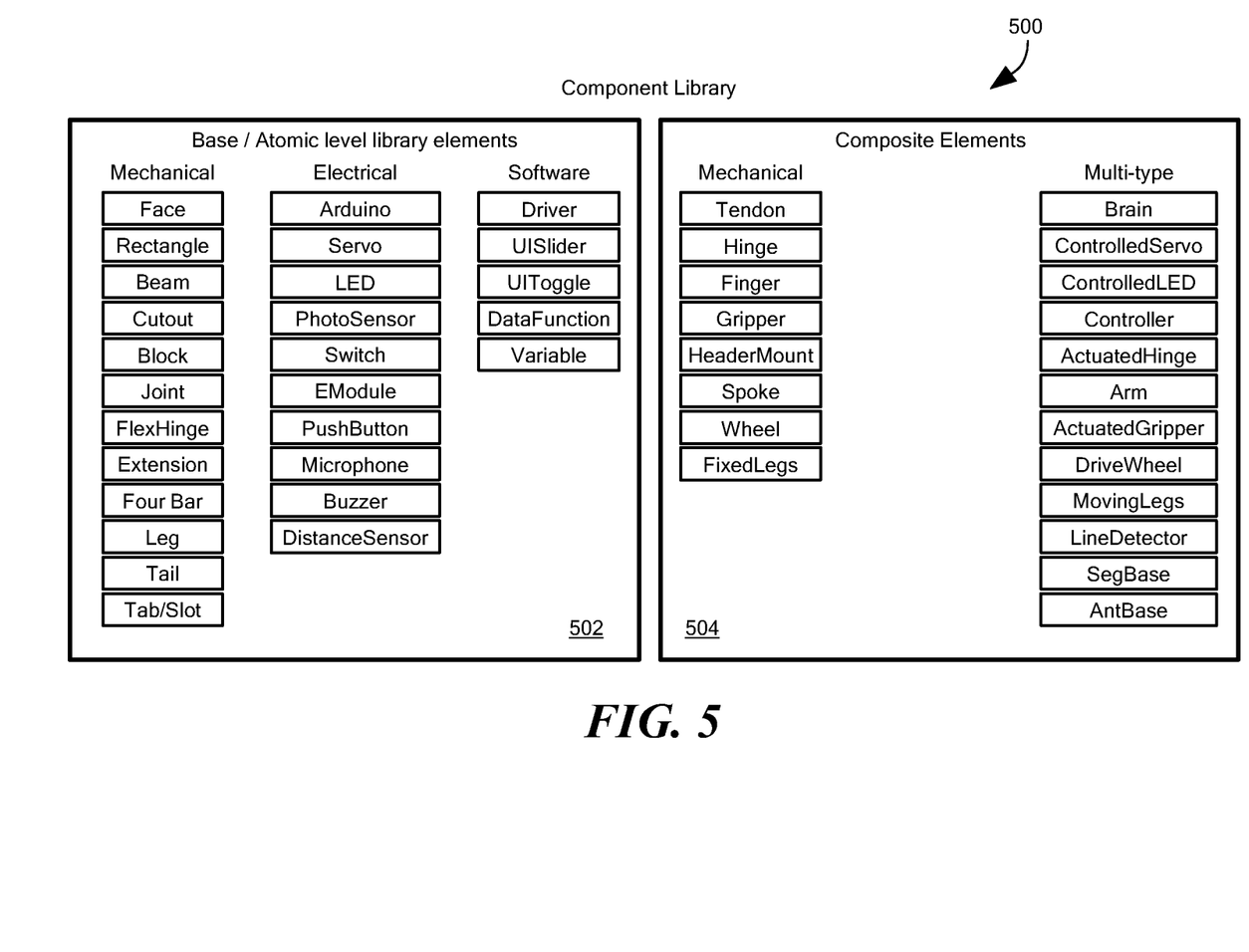
FIG. 5 is a block diagram of a library for storing predefined elements of a robot.

Referring now to FIG. 5, component library 500 may be the same as or similar to library 106 in FIG. 1. Library 500 can store base or atomic level elements 502. Base level elements are elements that do not call upon other elements. They include, but are not limited to, mechanical elements such as hinges, beams, extensions, tabs, etc. that can be incorporated into the robot design; electrical elements such as an Arduino board definition, an LED, a photo-sensor, a switch, etc.; and software elements such as software that can be executed by the central controller or other software elements that can be included in the robot design such as drivers, and/or software components, such as GUI elements like sliders, toggle switches, etc., that can comprise or be included in a software application used to control the robot.

Library 500 also includes composite elements 504, which include elements that incorporate other elements from library 500 such as the base or atomic level elements 502. As an example, a leg element may include one or more beams, firmware, motors, software, and/or GUI elements as part of the definition of the leg. Composite elements can include base elements and/or other composite elements as part of their definition. These base and composite elements can be accessed and used by the user to design the robot. In embodiments, the user can create the component elements and store them in library 500.

Figure 6:
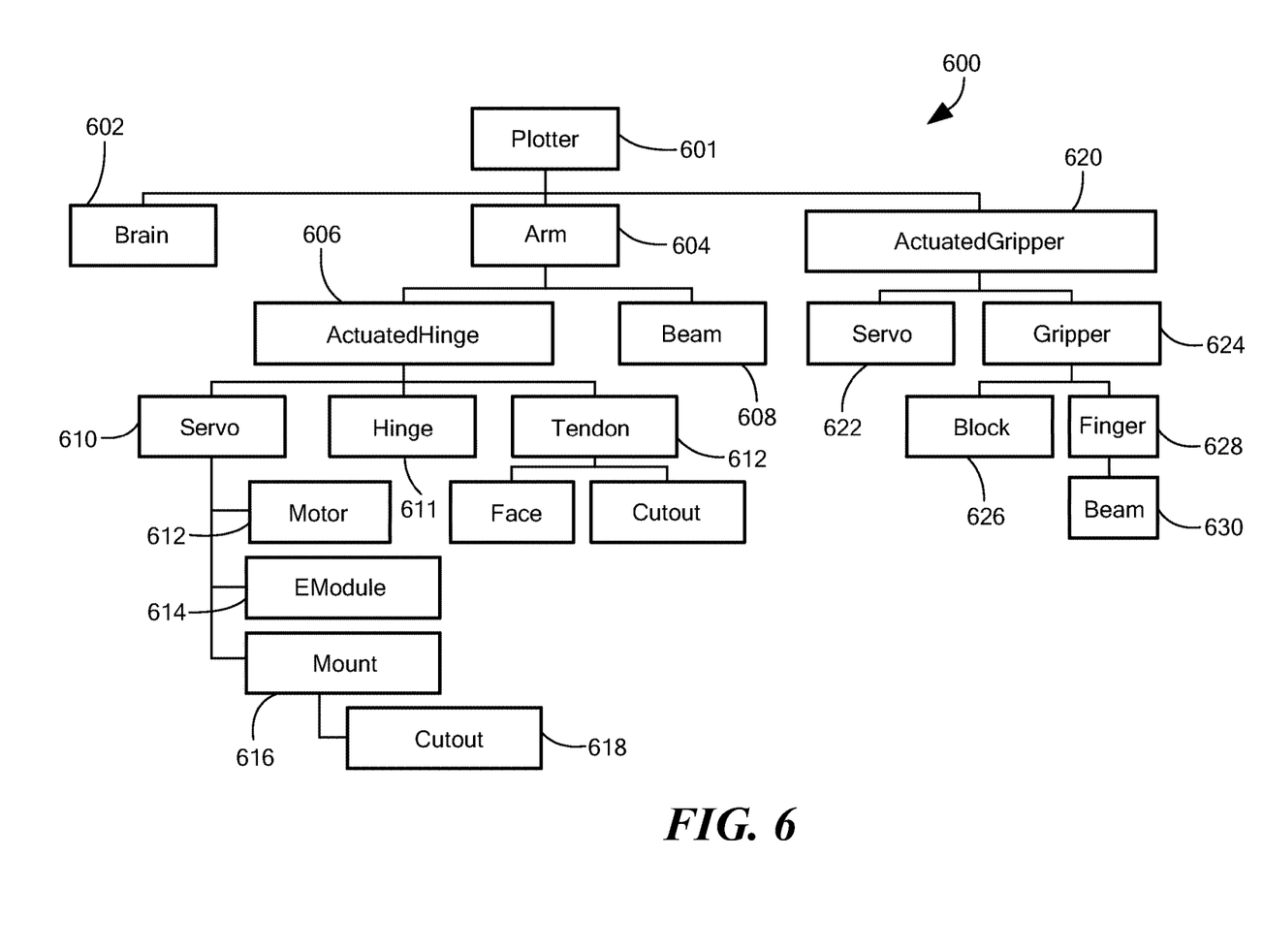
FIG. 6 is a hierarchical diagram of a robot arm design.
Figure 7:
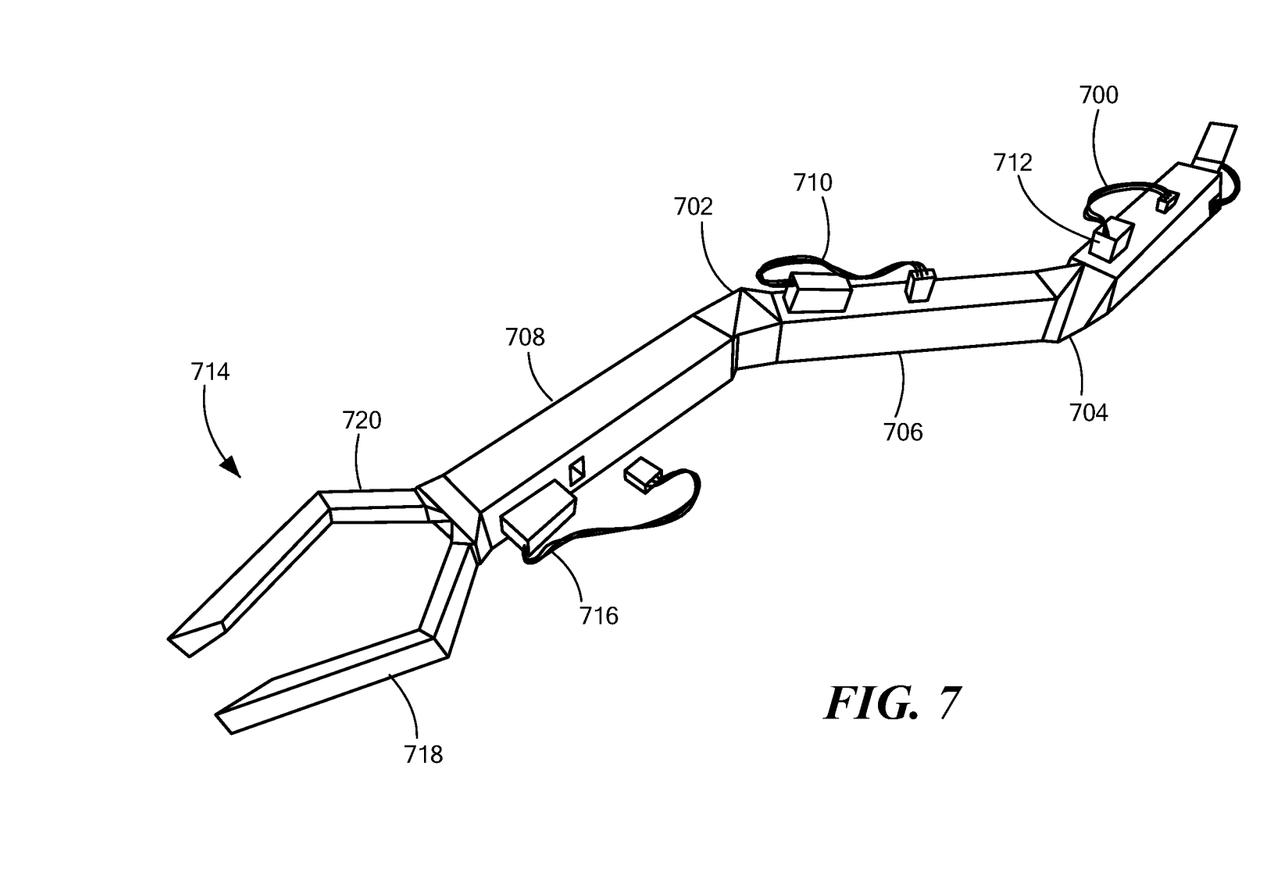
FIG. 7 is a perspective view of a robot arm.

Referring to FIG. 6, a hierarchical diagram 600 of library elements shows a particular design for the robotic arm or plotter 700 of FIG. 7.

Diagram 600 includes a top level element called plotter 601. Plotter 602 is the definition of the robot being designed. Referring also to FIG. 3, plotter 602 includes a brain 604, which may comprise software to be downloaded into central controller 302 to effectuate the robot design and initialize the component controllers 312-318 in accordance with the design.

Plotter 601 also includes an arm 604 having one or more actuated hinges 606 and beams 608. The actuated hinges 606 may correspond to elbows 702 and 704 in FIG. 7. The beams 604 may correspond to the arm beams 706 and 708. Each actuated hinge 606 includes a servo motor 610, which in turn includes a motor 612, an EModule or motor driver 614, and a mount 616. Each mount may include a cutout element 618. The servo motor elements can be seen as servo motors 710 and 712 in FIG. 7. The actuated hinges 606 also include a hinge element 611 that defines the mechanical structure of the hinge and a tendon element 612 that can be connected between the servomotor and the arm segments so that the motor can move the arm. The arm 604 also includes one or more beams 608.

Plotter 601 also includes an actuated gripper element 620, which in turns includes another servo 622 and a gripper element 624. The actuated gripper element can be seen as the grip portion 714 of arm 700. The actuated gripper element 620 also includes a gripper 624, which includes a block 626 and one or more fingers 628, each having one or more beams 630. Servo 622 corresponds to servo motor 716 in FIG. 7, and fingers 628 correspond to fingers 718 and 720 of the gripping portion 714.

The hierarchical definition of the plotter 601 informs the compiler 114 of the robot design. The compiler 114 may then compile the mechanical, electrical, and software components of fabrication system 116 that allow the robot to be assembled, as described above. As shown in FIGS. 6 and 7, the hierarchical definition of plotter 601 may produce a fabrication system which, when assembled, results in the assembled plotter arm as shown in FIG. 7.

Figure 8:
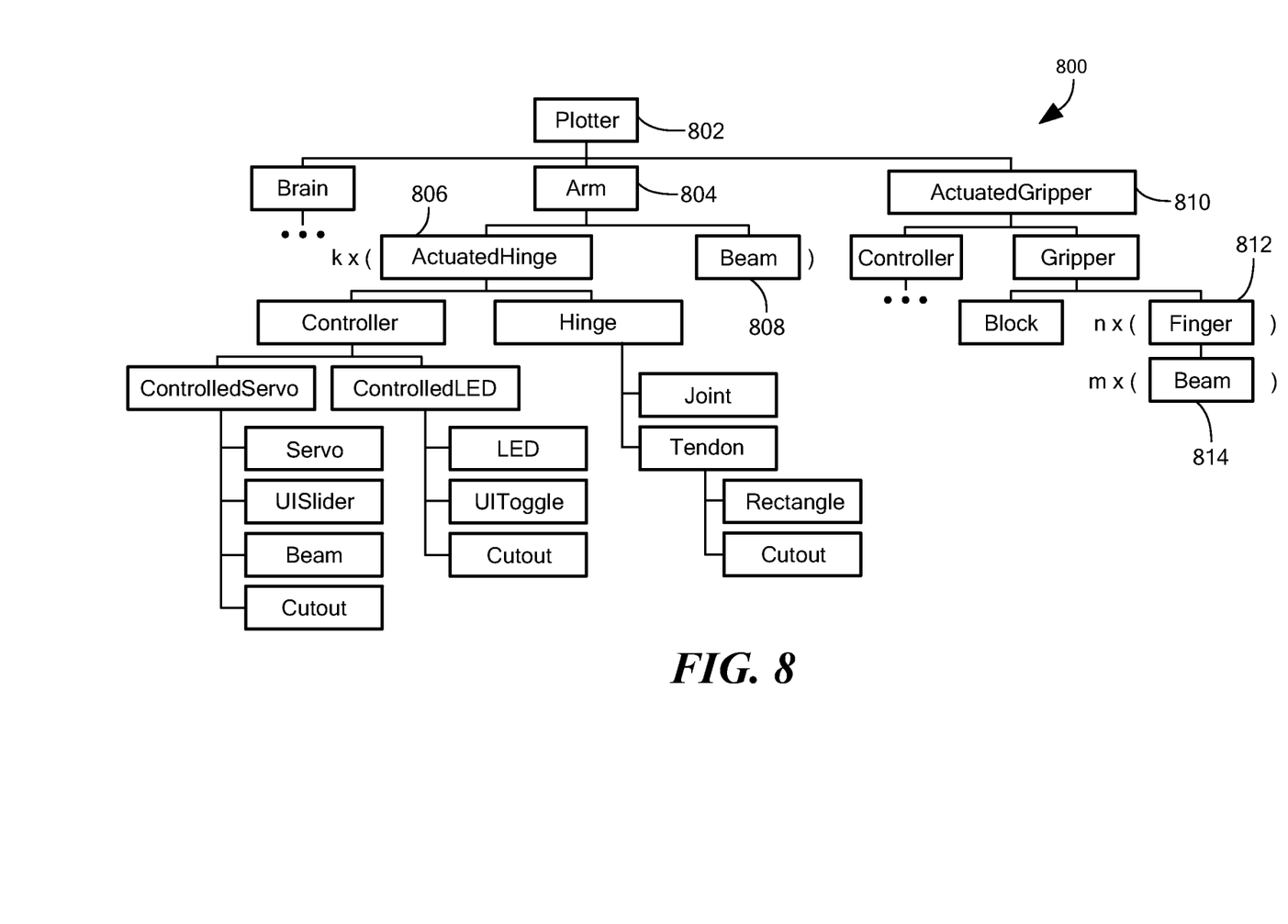
FIG. 8 is a hierarchical diagram of a manipulator arm design illustrating variable elements.

Referring now to FIG. 8, another robot design 800 includes a definition for a plotter 802, which may be the same as or similar to plotter 601. FIG. 8 illustrates that elements in the hierarchical design may include multiple instances. For example, the arm 804 includes k number of actuated hinge elements 806 and beam elements 808, depending on the parameters input by the user. Similarly, the actuated gripper element 810 includes n number of fingers 812, which each contain m number of beams 814, depending on the parameters input by the user. The number k and n can be set by the user, or can be set by the system. In embodiments, the numbers k and n may have default values that are stored in library 500 or computed by the system during compilation.

In an embodiment, a computer (or a series of computers connected by a network) includes a processor or series of processors and a volatile or non-volatile memory or series of memories. Computer readable instructions stored in the memory may be executed by the processor.

The computer may also include a database or series of databases that can be stored on a hard drive or other storage device. The database may be any database, relational or otherwise, known in the art that can store data such as model data for foldable machines.

Having described various embodiments, which serve to illustrate various concepts, structures and techniques, which are the subject of this patent, it will now become apparent to those of ordinary skill in the art that other embodiments incorporating these concepts, structures and techniques may be used. Accordingly, the scope of the patent should not be limited to the described embodiments but rather should be limited only by the spirit and scope of the following claims.

What is claimed is:

1. A system for generating applications for controlling a robot comprising:
   an interface, executed by a computing device, to receive design parameters for a robot;
   a library, stored in a memory, of predefined components each describing a modular element of the robot, the predefined components including electrical, mechanical, software, and composite elements; and
   computer readable instructions, stored in a memory, to implement a compiler to generate a robot design by modifying the predefined components by applying the design parameters to the predefined components, compiling software to be executed by the robot, and providing data and instructions for fabricating a mechanical and electrical system of the robot;
   means for assembling the robot from the compiled robot design.

2. The system of claim 1 wherein said compiler comprises:
   a composition engine configured to receive one or more predefined components and component design parameters and in response thereto provides a fabrication file, a wiring diagram, and a single set of component control code;
   an implementation engine configured to receive the fabrication file, wiring diagram, and a single set of component control code and in response thereto to provide instructions to one or more fabrication systems.

3. A system for generating a robot design comprising:
   an interface, executed by a computing device, receive design specification for a robot;
   a library, stored in a memory, of predefined components each describing a modular element of the robot; and
   computer readable instructions, stored in a memory, to implement a compiler to generate a robot design in accordance with the design specification and including one or more of the predefined components;
   means for assembling the robot from the compiled robot design.

4. The system of claim 3 wherein the interface is a user interface and the design specifications are entered by a user of the system.

5. The system of claim 3 wherein the predefined components comprise one or more of electrical components, mechanical components, and software components.

6. The system of claim 5 wherein the electrical components include definitions of electrical connections.

7. The system of claim 6 wherein the electrical connections include pin assignments for a controller module associated with the electrical component.

8. The system of claim 7 wherein the controller module is configured to communicate with a main controller of the robot and to control electrical and/or electromechanical elements of the predefined components.

9. The system of claim 5 wherein the mechanical components include reference designs that define a mechanical structure of a modular element of the robot.

10. The system of claim 5 wherein the software components include microcontroller code executed by the robot, user interface elements to allow a user to control the robot, or both.

11. The system of claim 5 wherein the predefined components further comprise composite components, which include one or more of the electrical components, the mechanical components, the software components, and/or other composite components.

12. The system of claim 5 wherein the robot design includes mechanical fabrication files.

13. The system of claim 12 wherein the mechanical fabrication files include a file to print a two-dimensional element, a file to print a three-dimensional element, or both.

14. The system of claim 13 wherein the mechanical fabrication files further include instructions for folding a printed two-dimensional element to form a three-dimensional element.

15. The system of claim 5 wherein the robot design includes a wiring diagram, instructions for electrically connecting the predefined components, or both.

16. The system of claim 5 wherein the robot design includes a compiled software application that provides a user interface for a user to directly operate the robot.

17. The system of claim 16 wherein the software application is configured to run on a mobile device.

18. The system of claim 5 wherein the robot design includes one or more software applications configured to be run by one or more controllers of the robot.

19. The system of claim 18 wherein the software application is run by a main controller and causes the main controller to communicate with one or more controller modules associated with the predefined components to control the predefined components.

20. The system of claim 3 wherein the compiler is configured to modify one or more of the predefined elements by applying the design parameters to one or more modifiable characteristics of the predefined elements.

21. The system of claim 20 wherein the compiler is further configured to add one or more predefined elements to the robot design.

22. A method comprising:
   receiving design specifications for a design of a robot;
   retrieving, from a robot component database, one or more predefined components each describing a modular element of the robot, the predefined components including electrical, mechanical, software, and composite elements;
   modifying the predefined components by applying the design specifications to the predefined components;
   generating software to be executed by one or more of the robot, the software including one or more communication modules for communicating with auxiliary controller modules associated with the predefined components; and
   generating mechanical fabrication files for manufacturing mechanical aspects of the modified predefined components of the robot; and
   generating electrical fabrication files for assembling electrical aspects of the modified predefined components of the robot;
   step means for assembling the robot from the compiled robot design generated software, mechanical fabrication files, and electrical fabrication files.

23. The method of claim 22 wherein generating the software includes generating software to be executed by a processing device for controlling the robot.

24. The method of claim 23 wherein the generating the software to be executed by a processing device for controlling the robot includes generating GUI elements.

* * * * *